July 18, 1939.  C. A. MANDERY  2,166,725
SALT SHAKER
Filed June 6, 1938
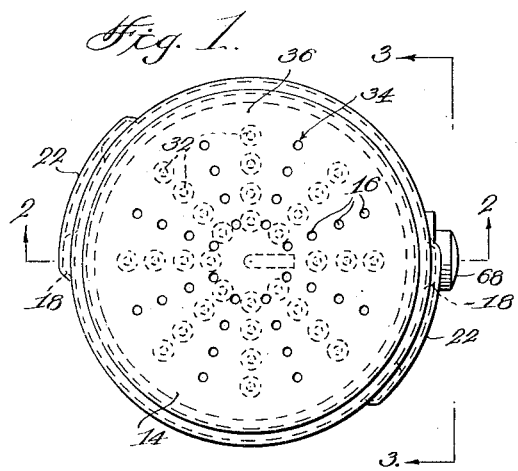
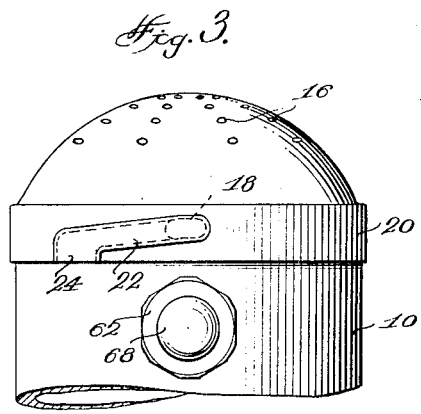
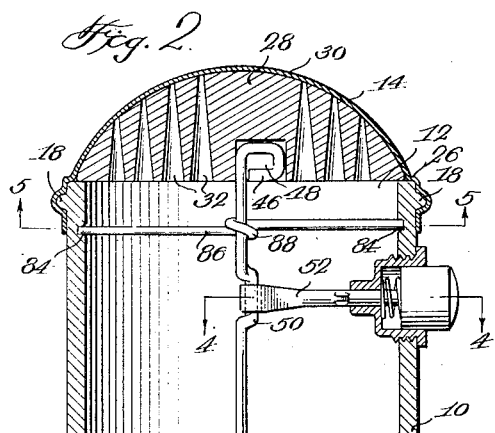
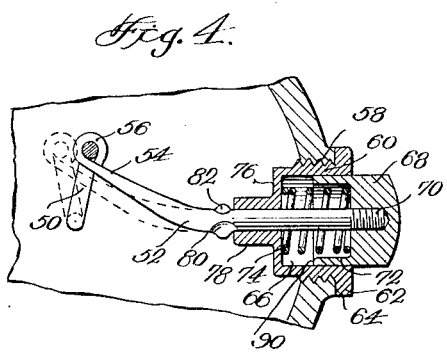
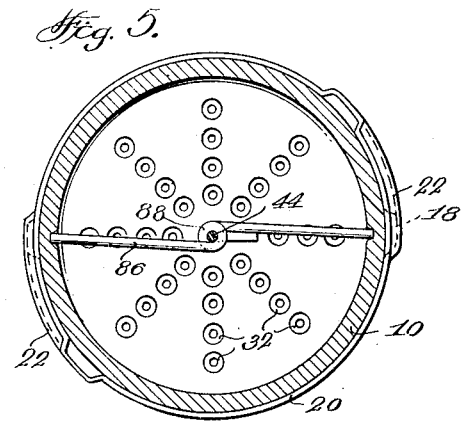
Carl Anthony Mandery
INVENTOR
BY Victor J. Evans & Co.
ATTORNEYS
WITNESS J P Markey Patented July 18, 1939

2,166,725

UNITED STATES PATENT OFFICE 2,166,725

SALT SHAKER

Carl Anthony Mandery, Sycamore, Ill.

Application June 6, 1938, Serial No. 212,164

2 Claims. (Cl. 65—45)

My invention relates to salt shakers and includes among its objects and advantages the provision of improved self-closing and moisture absorbing means.

In the accompanying drawing:

Fig. 1 is a top plan view of a salt shaker illustrating the invention;

Fig. 2 is a sectional view along the line 2—2 of Fig. 1;

Fig. 3 is a view taken from the position indicated by line 3—3 of Fig. 1 with the lower part of the salt shaker removed;

Fig. 4 is a sectional detail view along the line 4—4 of Fig. 2; and

Fig. 5 is a sectional view along the line 5—5 of Fig. 2.

In the embodiment selected to illustrate my invention, I make use of a container 10 having an open end 12 to which the cover 14 is removably connected. Cover 14 is perforated at 16 for the outlet of salt. I provide the container 10 with two outwardly projecting lugs 18 while the cover 14 is flanged at 20 and provided with angular channels 22 cooperating with the lugs 18 for drawing the cap against the open end of the container. Channels 22 are shaped as at 24 so as to permit complete disconnection of the cover from the container. Fig. 2 illustrates the cover 14 as being provided with a ledge 26 which is brought into pressure relation with the end of the container through the screw action imparted to the cover through the medium of the angular channels 22 and the lugs 18.

The cover 14 takes the form of a hemisphere, and within the cover I position a moisture absorbing element 28 in the nature of a spherical segment, which has a curved face 30 conforming to the curvature of the cover 14 and fitting snugly thereagainst. Moisture absorbing element 28 is of such diameter as to rest upon the end of the container 10 but is rotatable inside the cover 14 about the longitudinal axis of the container. Element 28 is provided with additional openings 32 which taper in the direction of the cover 14.

In Fig. 1, I illustrate the perforations 16 as being arranged in radially aligned groups 34 while the openings 32 are similarly arranged in radially aligned groups 36. Fig. 1 illustrates the normal position of the cover 14, at which time the groups of perforations 34 are offset with respect to the groups 36 so as to effectively seal the outlet perforations 16 because of the pressure relation between the element 28 and the inner face of the cover.

On the inner face of the bottom 38, I position a boss 40 having a bore 42 within which the lower end of a crank shaft 44 is rotatably supported. At the upper end of the crank shaft 44, I form a loop 46 which lies within a slot 48 in the element 28. Loop 46 fits snugly inside the slot so as to be restrained from relative movement therein. Intermediate the ends of the crank shaft 44, I position a crank 50 which is connected with a shaft 52. This shaft is flattened, as at 54, and is bent at 56 to loosely embrace the crank 50.

In the wall of the container 10, I position a threaded opening 58 for the reception of a threaded plug 60 having a flange 62 bearing against the box 64 projecting from the container wall. Screw plug 60 includes a large bore 66 within which a button 68 is slidably mounted and fixedly connected with the threaded end 70 of the shaft 52. Button 68 is bored at 72 for the reception of one end of a compression spring 74. One end of the spring abuts the cap while the other end is arranged in abutting relation with the wall 76 of the plug 60. The neck 78 of the button 68 is bored at 80 to loosely support the shaft 52. Spring 74 normally holds the button in the position of Fig. 4, at which time the crank 50 takes the full line illustration. In this position of the crank, the element 28 takes the position of Fig. 1 with its openings 36 offset with respect to the perforations 34. The shaft is provided with ears 82 which abut the neck 78 to limit the action of the spring 74 on the shaft 52.

In the inner face of the container 10 I provide two recesses 84 within which the ends of a wire 86 are positioned. This wire is bent to provide a loop 88 which loosely embraces the crank shaft 44 in the nature of a bearing to lend support thereto. While the wire 86 is longer than the inside diameter of the container 10, the wire may be bent for positioning its ends within the recesses 84.

In operation, salt may be dispensed by merely pressing the button 68 inwardly. Such movement of the button turns the crank shaft sufficiently far to rotate the element 28 for bringing its openings 32 into alignment with the perforations 16. For the purpose of securing precise alignment of the perforations 16 with the openings 32, the button 68 is of such length as to bring its end 90 into abutting relation with the wall 76 when the openings 32 are precisely aligned with the perforations 16 so as to restrain the element from further rotation. Spring 74 is of such tension as to bring the element 28 back to its normal position as soon as pressure is released from the button. Openings 32 are of tapered configuration so as to constitute relatively large mouths to facilitate movement of the salt. The element 28 is of considerable mass and may comprise wood or other fibrous material for moisture absorbing purposes. The element functions to absorb moisture in the salt so as to maintain it in a dry condition. The element fits snugly against the cap so as to have sealing relation therewith. Should it be necessary for any reason to remove the element 28, this may be done by unscrewing the cover 14 and lifting the element off the top of the container.

Without further elaboration, the foregoing will so fully explain my invention that others may, by applying current knowledge, readily adapt the same for use under various conditions of service.

I claim:

1. A shaker comprising a container having an open end, a perforated cover detachably connected with the open end of the container, a rotative body fitting snugly against the inner face of the cover and resting on said open end, said rotative body having perforations arranged to be brought into alignment with the perforations in the cover when the moisture absorbing body is rotated relatively to the cover, a shaft having one end rotatively related to the bottom of the container and its other end keyed to the rotative body for rotating the latter when the shaft is rotated, a brace member for the upper end of said shaft anchored to the wall of the container, a crank interposed in said shaft, a reciprocatory operating shaft having one end loosely connected with said crank and its other end extending loosely through an opening in the wall of the container, and resilient means cooperable with the operating shaft and the wall of the container for yieldingly holding the operating shaft in its normal position, with the perforations in the rotative body out of register with the perforations in the cover, said first shaft being rotated by an inward thrust of the operating shaft for rotating the rotative body to bring its perforations into register with the perforations in the cover.

2. A shaker comprising a container having an open end, a perforated spherical segment lying on said open end, a perforated cover detachably connected with said open end and fashioned to fit snugly against the curved face of the spherical segment, the perforations in the spherical segment being adapted to be brought into register with the perforations in the cover through rotation of the spherical segment relatively to the cover, a shaft having one end rotatively related to the bottom of the container and its other end keyed to the spherical segment for rotating the latter when the shaft is rotated, a crank interposed in said shaft, a reciprocatory operating shaft having one end loosely connected with said crank and its other end extending loosely through an opening in the wall of the container, and resilient means cooperable with the operating shaft and the wall of the container for yieldingly holding the operating shaft in its normal position, with the perforations in the spherical segment out of register with the perforations in the cover, said first shaft being rotated by an inward thrust of the operating shaft for rotating the spherical segment to bring its perforations into register with the perforations in the cover.

CARL ANTHONY MANDERY.